US012740542B2

(12) United States Patent
Coady

(10) Patent No.: US 12,740,542 B2
(45) **Date of Patent: *Sep. 22, 2026**

(54) ANCHORING SYSTEMS FOR MOBILE LIVESTOCK ENCLOSURES

(71) Applicant: PERDUE FOODS LLC, Salisbury, MD (US)

(72) Inventor: Daniel J. Coady, Warmer Springs, CA (US)

(73) Assignee: Perdue Foods LLC, Salisbury, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/991,664

(22) Filed: Dec. 22, 2024

(65) Prior Publication Data

US 2025/0374884 A1 Dec. 11, 2025

Related U.S. Application Data

(63) Continuation of application No. 18/244,678, filed on Sep. 11, 2023, now Pat. No. 12,225,876, which is a continuation of application No. 17/317,125, filed on May 11, 2021, now Pat. No. 11,778,977.

(51) Int. Cl.

| | |
|---|---|
| ***A01K 1/00*** | (2006.01) |
| ***A01K 3/00*** | (2006.01) |
| ***A01K 31/22*** | (2006.01) |
| ***E02D 5/80*** | (2006.01) |

(52) U.S. Cl.
CPC .............. *A01K 1/0035* (2013.01); *A01K 3/00* (2013.01); *A01K 31/22* (2013.01); *E02D 5/801* (2013.01)

(58) Field of Classification Search
CPC ........ A01K 1/0035; A01K 3/00; A01K 31/22; E02D 5/801
See application file for complete search history.

(56) References Cited

U.S. PATENT DOCUMENTS

| | | | |
|---|---|---|---|
| 4,048,959 | A | 9/1977 | Steele |
| 4,341,181 | A | 7/1982 | Fair |
| 4,626,330 | A | 12/1986 | Farmer |
| 4,787,603 | A | 11/1988 | Norton |
| 5,572,954 | A | 11/1996 | Elkins |
| 6,272,798 | B1 | 8/2001 | Cockman |

(Continued)

FOREIGN PATENT DOCUMENTS

| | | | | |
|---|---|---|---|---|
| CN | 208047656 U | 11/2018 | | |
| EP | 1176258 A1 * | 1/2022 | ............ | E02D 5/805 |
| WO | 2017220830 A1 | 12/2017 | | |

OTHER PUBLICATIONS

International Search Report and Written Opinion for Application No. PCT/US2022/028610, mailed on Jul. 28, 2022, 11 pages.

(Continued)

*Primary Examiner* — Ebony E Evans
(74) *Attorney, Agent, or Firm* — Esplin & Associates, PC

(57) ABSTRACT

In general, one aspect disclosed features an anchoring system for anchoring an at least partially floorless mobile livestock enclosure to the ground. The anchoring system comprising: a securing flange configured to mechanically couple the anchoring system to the enclosure; an anchor; and a drive configured to place the anchor into contact with the ground, and to retract the anchor from contact with the ground.

20 Claims, 7 Drawing Sheets

(56) References Cited

U.S. PATENT DOCUMENTS

| | | | | |
|---|---|---|---|---|
| D456,131 | S | 4/2002 | Dotson, Jr. et al. | |
| 6,547,203 | B1 | 4/2003 | Willard | |
| 7,581,707 | B2 | 9/2009 | Saraf | |
| 7,640,890 | B1 | 1/2010 | Maynard | |
| 7,921,794 | B1 | 4/2011 | Cullom et al. | |
| 8,336,905 | B1 | 12/2012 | Mollhagen et al. | |
| 8,534,230 | B2 | 9/2013 | Wilson | |
| 8,991,108 | B1 | 3/2015 | Zamrzla | |
| 8,998,162 | B1 | 4/2015 | Gutha et al. | |
| 9,107,387 | B1 | 8/2015 | Pavlik | |
| 9,974,246 | B2 | 5/2018 | Frager | |
| 10,125,513 | B2 | 11/2018 | Jecel | |
| 11,778,977 | B2 * | 10/2023 | Coady | A01K 1/0035<br>119/496 |
| 12,225,876 | B2 * | 2/2025 | Coady | A01K 1/0035 |
| 2003/0209207 | A1 | 11/2003 | Campbell et al. | |
| 2015/0121770 | A1 | 5/2015 | Korus | |
| 2017/0295756 | A1 * | 10/2017 | Rynne | A01K 31/18 |
| 2018/0077919 | A1 | 3/2018 | McNew | |
| 2019/0059318 | A1 | 2/2019 | Hanson | |
| 2021/0031890 | A1 | 2/2021 | Alshuhail | |

OTHER PUBLICATIONS

International Preliminary Report on Patentability for Application No. PCT/US2022/028610, mailed on Nov. 23, 2023, 6 pages.

* cited by examiner 200
224
210

208A
214
212
108
208B
218
202
206
220
208A
214
224
210

ANCHORING SYSTEMS FOR MOBILE LIVESTOCK ENCLOSURES

CROSS REFERENCE TO RELATED APPLICATIONS

The present application is a continuation of U.S. patent application Ser. No. 18/244,678, filed on Sep. 11, 2023, now allowed, which is a continuation of U.S. application Ser. No. 17/317,125, filed May 11, 2021, issued as U.S. Pat. No. 11,778,977, each of which is incorporated by reference herein in its entirety.

FIELD

The present disclosure relates to mobile livestock enclosures.

BACKGROUND

Conventional poultry and/or swine production uses stationary facilities. Due to their stationary nature, poultry and/or swine in conventional facilities often live in dirty litter and/or fecal matter. As such, facilities require vaccines, antibiotics and/or other drugs, and/or increased management practices to keep livestock healthy. Stationary facilities also require litter, bedding, and/or waste disposal/removal which leads to high materials costs, elevated labor costs, and environmental concerns. Furthermore, poultry and/or swine that are treated with vaccines, drugs, and antibiotics, which may subsequently lead to negative health effects on humans that consume their meat and eggs.

For these reasons, there is an increasing interest in pasture raising poultry and/or swine. However, existing methods of pasture raising poultry and/or swine are expensive for both farmers and consumers, and thus are typically limited to small scale production. The amount of land and labor required to manage a large quantity of grazing poultry and/or swine has typically prevented pasture raised poultry and/or swine from being scalable for commercial poultry and/or swine farmers.

SUMMARY

In general, one aspect disclosed features an anchoring system for anchoring an at least partially floorless mobile livestock enclosure to the ground, the anchoring system comprising: a securing flange configured to mechanically couple the anchoring system to the enclosure; an anchor; and a drive configured to place the anchor into contact with the ground, and to retract the anchor from contact with the ground.

Embodiments of the system may include one or more of the following features. In some embodiments, the drive comprises at least one of: a motor; or a hand crank. In some embodiments, the anchor is a rod; and the drive is configured to drive the rod into the ground, and to retract the rod from the ground. In some embodiments, the rod is threaded; and the drive is configured to rotate the threaded rod in a first direction to drive the threaded rod into the ground, and to rotate the threaded rod in a second direction to retract the threaded rod from the ground. In some embodiments, the threaded rod comprises at least one of: a cutting head; and an auger bit. In some embodiments, the threaded rod is threaded through a threaded hole in the securing flange. Some embodiments comprise a guide configured to prevent rotation of the drive as the drive rotates the threaded rod and moves up and down along the guide. Some embodiments comprise a housing configured to enclose the threaded rod, wherein the housing is further configured to prevent the threaded rod from bending. In some embodiments, the drive is fixed with respect to the enclosure; and the threaded rod moves longitudinally with respect to the drive as the drive rotates the threaded rod. In some embodiments, the enclosure comprises multiple wheels to allow the enclosure to move across the ground, and at least one brake configured to prevent rotation of the wheels, the drive comprises a motor, and the anchoring system further comprises a controller configured to control the motor of the anchoring system to retract the anchor prior to releasing the at least one brake. In some embodiments, the controller is further configured to engage the at least one brake prior to placing the anchor into contact with into the ground. In some embodiments, the enclosure comprises at least one second motor configured to drive the wheels of the enclosure; and the controller is further configured to automatically control the motor of the anchoring system to retract the anchor, then release the at least one brake, then control the at least one second motor to move the enclosure to a new location, then engage the at least one brake, then control the motor of the anchoring system to place the anchor into contact with the ground. In some embodiments, the drive is a motor; and the anchoring system further comprises a sensor configured to sense when the motor is unable to drive the anchoring rod into the ground, or to retract the anchoring rod from the ground. Some embodiments comprise a controller configured to shut off the motor responsive to the sensor sensing the motor is unable to drive the anchoring rod into the ground, or to retract the anchoring rod from the ground. In some embodiments, the enclosure comprises multiple wheels to allow the enclosure to move across the ground, and at least one brake configured to prevent rotation of the wheels; and the controller is configured not to release the at least one brake responsive to the sensor sensing the motor is unable to retract the anchoring rod from the ground.

In general, one aspect disclosed features an anchoring system for anchoring an at least partially floorless mobile livestock enclosure to the ground, the anchoring system comprising: a stake having a standing end and a free end; a hinge mechanically coupled between the standing end of the stake and the enclosure; and a drive configured to lower the free end of the stake to the ground; and to raise the free end of the stake from the ground; wherein motion of the enclosure in a first direction with respect to the ground drives the free end of the stake into the ground.

Embodiments of the system may include one or more of the following features. In some embodiments, the free end is pointed. In some embodiments, the drive is a motor. In some embodiments, the enclosure comprises multiple wheels to allow the enclosure to move across the ground, and at least one second motor configured to drive the wheels; and the anchoring system further comprises a controller configured to automatically control the at least one second motor to move the enclosure in the first direction to drive the free end of the stake into the ground. In some embodiments, the enclosure comprises multiple wheels to allow the enclosure to move across the ground, and at least one second motor configured to drive the wheels; and wherein the controller is further configured to control the at least one second motor to move the enclosure in a second direction different from the first direction, wherein motion of the enclosure in the second direction retracts the stake from the ground.

DETAILED DESCRIPTION

In response to the above-described problems with conventional methods of pasture raising poultry and/or swine, mobile poultry and/or swine enclosures have been developed. In this description, such enclosures are also referred to as "livestock" enclosures. These enclosures are generally large and lightweight, and are therefore highly susceptible to strong wind, which could topple the enclosure, releasing the livestock and damaging the enclosure. Conventional means for securing structures to the ground would prevent the frequent moves employed to move the livestock enclosure to fresh pasture. Weighting the structure would make these moves more difficult, and would increase forage destruction and pasture compaction.

Embodiments of the described technologies provide anchoring systems for mobile livestock enclosures. These anchoring systems allow livestock enclosures to be quickly and securely anchored to the ground, and just as quickly and easily released for moving the enclosure. In some embodiments, these systems are automated. In some embodiments, an electronic controller may automate all or part of the process of relocating a livestock enclosure, for example by controlling the wheels, brakes, and anchoring systems of the enclosure.

Figure 1:
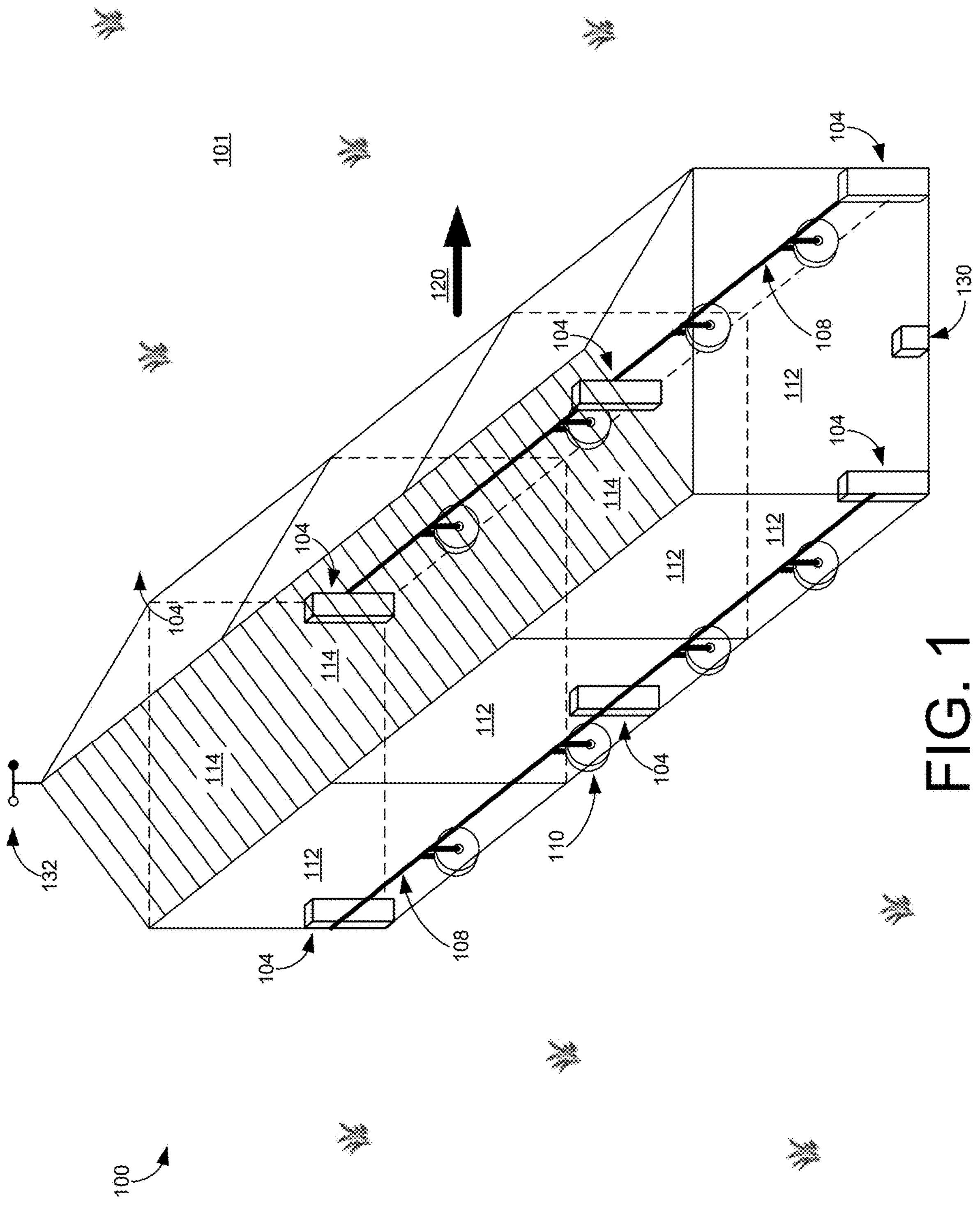
FIG. 1 illustrates an example livestock enclosure, in accordance with one or more implementations.

FIG. 1 illustrates an example livestock enclosure, in accordance with one or more implementations. The livestock enclosure 100 may be moved and/or may move across a pasture 101.

In some implementations, the livestock enclosure 100 may include a frame 108. In some embodiments, the frame 108 may be constructed from 10"×¼" flat metal bar. In other embodiments, the frame 108 may be constructed from other materials.

The livestock enclosure 100 may include multiple wall barriers 112 and/or roof barriers 114. The wall barriers 112 and/or roof barriers 114 may at least partially form the enclosure and/or contain the livestock within the enclosure. The wall barriers 112 and/or roof barriers 114 may be coupled to the frame 108. In some implementations, the wall barriers 112 and/or roof barriers 114 may be resiliently flexible. By way of non-limiting example, the wall barriers 112 and/or roof barriers 114 may be made of fences, walls, netting, wood, paneling, mesh, wire, cloth, metal sheeting, shingles, tarpaper, windows, canvas, plastic, tarp, rubber, other materials, or a combination thereof. In some embodiments, one or more wall barriers 112 (e.g., the outer walls) may consist of chicken wire or a comparable predator-deterring barrier that doesn't prevent fresh air and sunlight from entering the enclosure 100. In some embodiments, for example, one or more portions of wall barriers 112 may include canvas, plastic, and/or another material that rolls up/down for temperature regulation (the deployment of which may automated, including by thermostatic regulation). In some implementations, the one or more wall barriers 112 may have multiple layers with one or more slits along its length in order to conform to the contours of the pasture and/or close any gaps through which the livestock could escape.

Livestock enclosure 100 may be all or partially floorless. As such, the livestock contained in the enclosure 100 may be able to graze on a portion of the pasture 101. In some implementations, the enclosure 100 may include a chassis with wheels 110 that allows the enclosure 100 to move across the pasture 101, as indicated by the arrow at 120. In some implementations, the wheels may be replaced or augmented by similar mechanisms such as tracks. In some implementations, the pasture 101 may include cables, tracks, skids, and/or rails that facilitate the movement of the enclosure. In some embodiments, the enclosure 100 may include one or more motors to drive the wheels 110. In some embodiments the enclosure 100 may include one or more brakes to prevent the wheels 110 from turning. The enclosure 100 may include a controller 130. The controller 130 may be implemented as described below with reference to FIG. 5. The controller 130 may be configured to operate the brakes and the drive motors of the wheels 110.

The enclosure 100 may include one or more weather sensors 132. For example, the weather sensors 132 may include a wind sensor and/or similar weather sensors. The weather sensors 132 may communicate with the controller 130. In some embodiments, the controller 130 may obtain weather information from a weather server over a wireless network connection.

In the described embodiments, the enclosure may include one or more anchoring systems 104. In the example of FIG. 1, the enclosure 100 includes six anchoring systems 104: one at each corner of the enclosure 100, and one midway along each long wall. In other embodiments, other number and positions of the anchoring systems 104 may be employed. In some embodiments, the controller 130 may be configured to operate the anchoring systems 104.

Figures 2A, 2B:
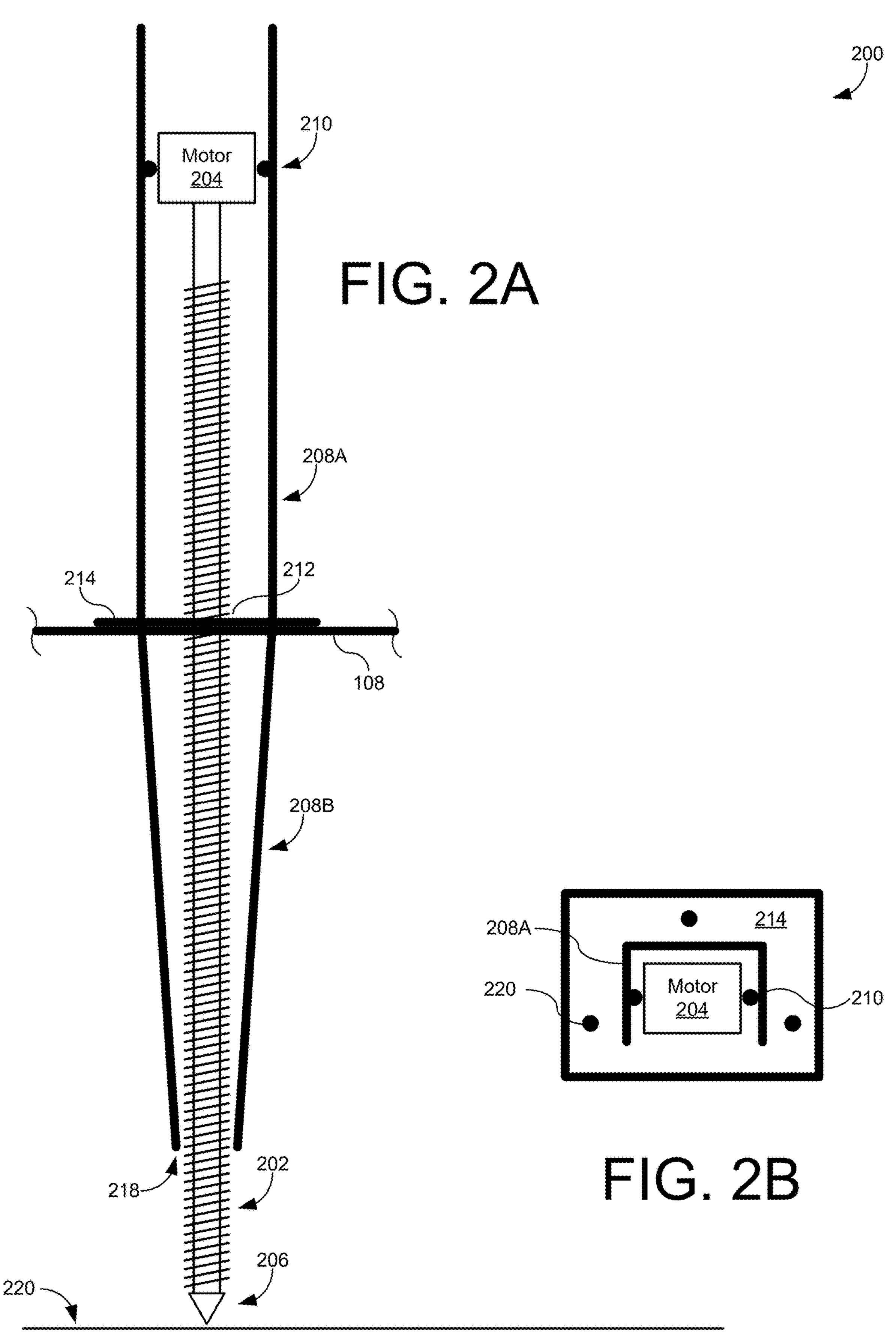
FIGS. 2A, 2B, 2C, 2D illustrate an anchoring system according to some embodiments of the disclosed technology.
Figures 2C, 2D:
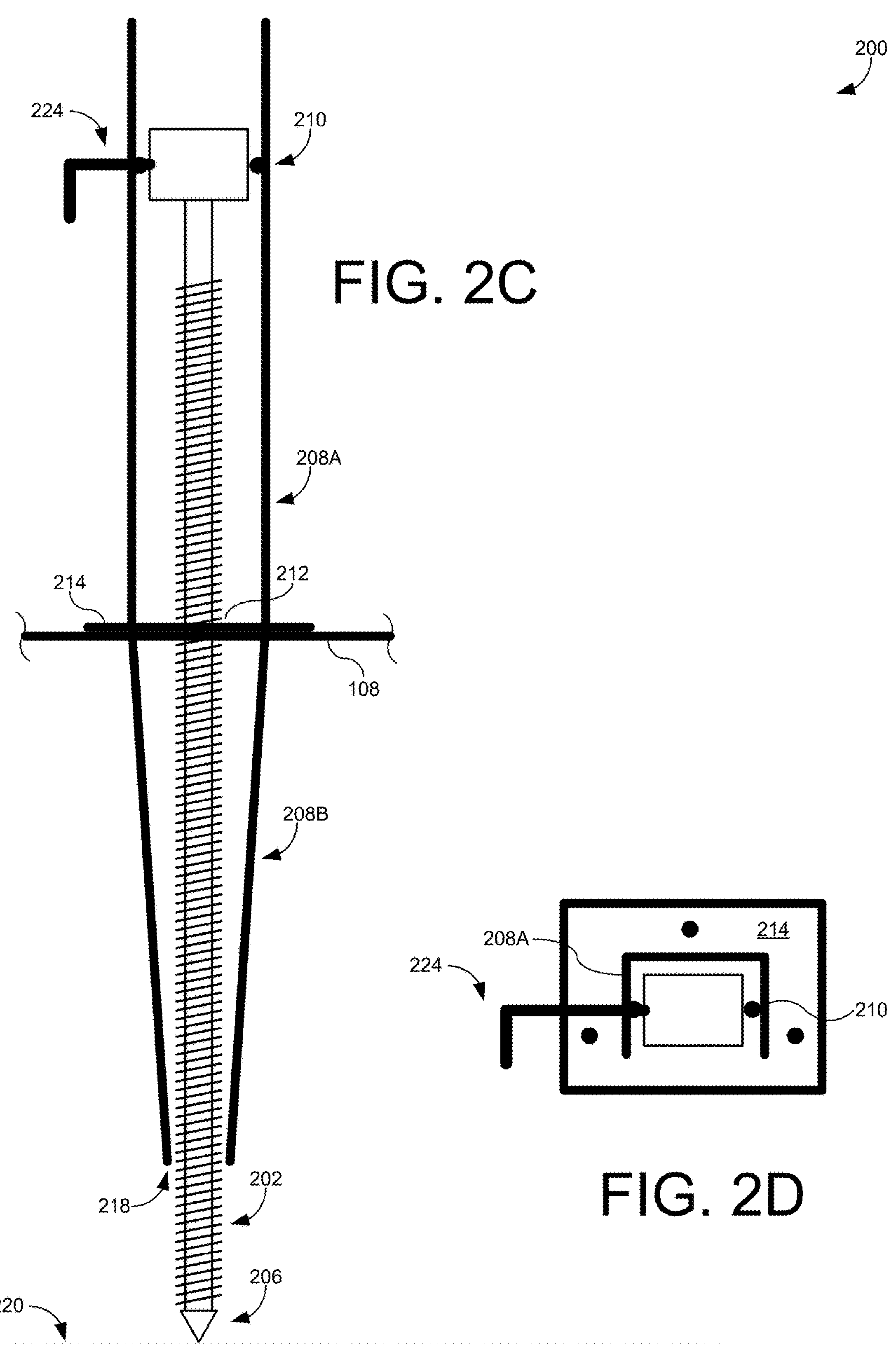

FIGS. 2A, 2B, 2C, 2D illustrate an anchoring system 200 according to some embodiments of the disclosed technology. FIG. 2A is a side view, while FIG. 2B is a top view. Referring to FIG. 2A, the anchoring system 200 may include a rod 202. In some embodiments, the rod may be threaded. In some embodiments, the threaded rod may be ¾" in diameter, and 4' in length. In other embodiments, other lengths and diameters may be employed. In some embodiments, the threaded rod 202 may be equipped with specialized tip 206. The tip 206 may be implemented as a cutting head, auger bit, or similar tip.

The threaded rod 202 may be threaded through a threaded hole 212 in a securing flange 214. The securing flange may be mechanically coupled to the frame 108 of the enclosure 100 of FIG. 1. For example, referring to FIG. 2B, the securing flange 214 may include one or more holes 224 for bolting the securing flange 214 to the frame 108. The securing flange 214 may be made of the same material as the frame 108. In other embodiments, the anchoring system 200 may be attached to the enclosure at another attachment point instead of, or in addition to, the securing flange 214.

Referring again to FIG. 2A, the anchoring system 200 may include a drive such as a motor 204 configured to rotate the threaded rod 202. Due to the engagement of the threads of the threaded rod 202 with the threads of the threaded hole 212, the motor 204 and the threaded rod 202 may travel up and down as the motor 204 rotates the threaded rod 202. The anchoring system 200 may include an upper housing 208A and one or more guides 210 to prevent the motor 204 from rotating about the axis of the threaded rod 202. The upper housing 208A may be fabricated from 4"×3/8" flat metal bar. The guides 210 may include one or more wheels to reduce friction. In some embodiments, the drive may be implemented with other mechanisms, for example such as hand crank 224, illustrated in FIGS. 2C and 2D.

As the threaded rod 202 moves downward, it is driven into the ground 220. As the threaded rod 202 continues to move downward, the threads of the threaded rod 202 engage the ground 220. When a portion of the threaded rod 202 is firmly embedded in the ground, the anchoring system 200 is anchored to the ground. The motor 204 may rotate the threaded rod 202 in the opposite direction to retract the threaded rod 202 from the ground 220.

The anchoring system may include a lower housing 208B. The lower housing 208B may be fabricated from the same material as the upper housing 208A. The lower housing 208B may be tapered so that the threaded rod 202 exits the lower housing 208B through a small hole 218. This arrangement may provide the threaded rod 202 with lateral support to prevent the threaded rod 202 from bending under lateral loads such as those that may be generated by high winds.

In the embodiments of FIGS. 2A,B, the motor 204 travels with the threaded rod 202. In other embodiments, the motor 204 is fixed with respect to the frame 108 of the enclosure 100, and the threaded rod 202 moves longitudinally with respect to the motor 204.

In some embodiments, the threaded rod 102 may be driven into the ground without rotating. In these embodiments, the threaded rod 202 may be driven by the motor 204 using a worm gear, by a pneumatic or hydraulic mechanism, or by other drive mechanisms.

Figure 3:
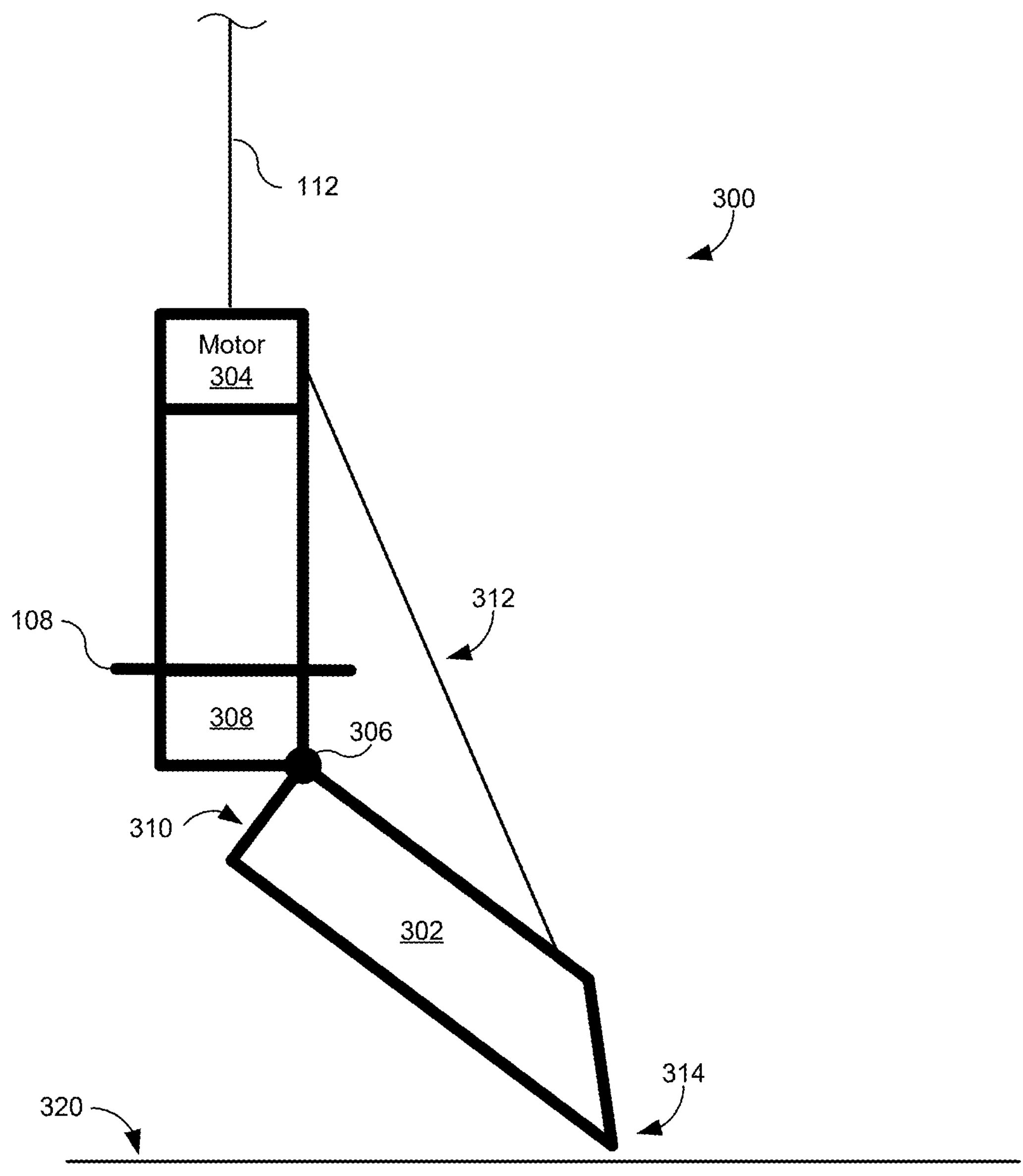
FIG. 3 illustrates an anchoring system according to some embodiments of the disclosed technology.

FIG. 3 illustrates an anchoring system 300 according to some embodiments of the disclosed technology. Referring to FIG. 3, a pivoting stake 302 may be mechanically coupled to the frame 108 of the enclosure 100. The standing end 310 of the stake 302 may be mechanically coupled by a hinge 306 to a post 308 that is mechanically coupled to the frame 108. The stake 302, hinge 306, and post 308 may be fabricated from 4"×3/8" metal bar. Also shown for reference in FIG. 3 is an external wall 112 of the enclosure 100.

The pivoting stake 302 may be raised and lowered by a motor 304 and a cable 312. The free end 314 of the pivoting stake 302 may be pointed. When the enclosure 100 is in a desired location, the motor 304 may lower the pivoting stake 302 so the pointed end 314 makes contact with the ground 320. Any motion of the enclosure 100 in the direction of the pointed end 314 of the pivoting stake 302 may drive the pointed end 314 of the pivoting stake 302 into the ground 320, thereby preventing further motion of the enclosure 100 in that direction. This motion may be spontaneously caused by environmental factors such as strong winds, or may be induced intentionally by controlling the wheels 110 of the enclosure 100. The pivoting stake 302 may be extracted from the ground 320 by controlling the wheels 110 to move the enclosure 100 in the opposite direction.

In some embodiments, the anchoring system may include a controller and a sensor configured to sense when the motor is unable to drive the anchoring rod into the ground, or to retract the anchoring rod from the ground. In these embodiments, the controller may be configured to shut off the motor responsive to the sensor sensing the motor is unable to drive the anchoring rod into the ground, or to retract the anchoring rod from the ground. In these embodiments, the controller may be configured not to release the brakes or drive the wheels of the enclosure responsive to the sensor sensing the motor is unable to retract the anchoring rod from the ground.

In some embodiments, one or more of the anchoring rods may be replaced with anchors. In these embodiments, the motors may be configured to place the anchors in contact with the ground, and to retract the anchors from contact with the ground. In some embodiments, the anchors may include heavy weights. in these embodiments, the motors may raise and lower the weights. In some embodiments, the anchors may include bladders. In these embodiments, the motors may be configured to pump fluids into and out of the bladders. Other anchors and motor arrangements are contemplated.

Figure 4:
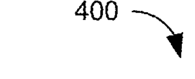
FIG. 4 is a flowchart illustrating a process for automatically repositioning a mobile livestock enclosure to a new location according to some embodiments of the disclosed technologies.
Figure 4:
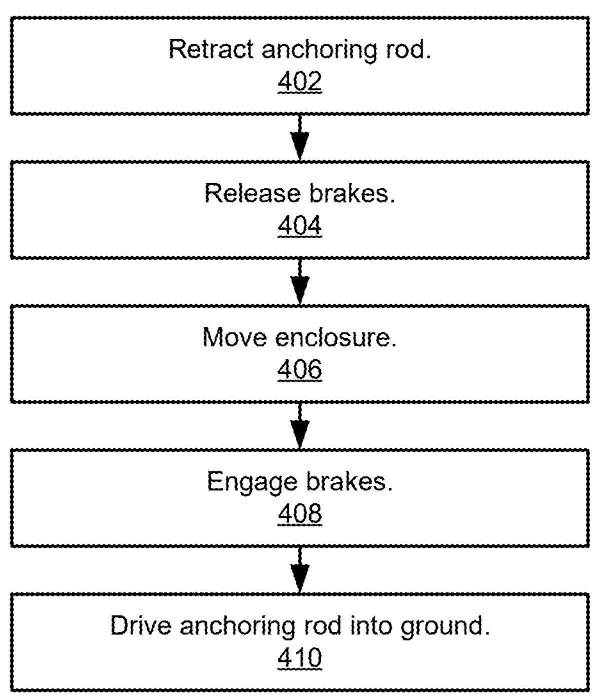

In some embodiments, the controller may be configured to automatically reposition the enclosure 100 to a new location. The controller may be implemented as described below with reference to FIG. 5. FIG. 4 is a flowchart illustrating a process 400 for automatically repositioning a mobile livestock enclosure 100 to a new location according to some embodiments of the disclosed technologies.

The elements of the process 400 are presented in one arrangement. However, it should be understood that one or more elements of the process may be performed in a different order, in parallel, omitted entirely, and the like. Furthermore, the process 400 may include other elements in addition to those presented. For example, the process 400 may include error-handling functions if exceptions occur, and the like.

Referring now to FIG. 4, the controller may control the motor of the anchoring system to retract the anchoring rod, at 402. The anchoring system may include sensors to detect when the anchoring rod has been retracted. After the anchoring rod has been retracted, the controller may release the brakes on the wheels 110 of the enclosure 100, at 404. The enclosure 100 may include sensors to detect when the brakes have been released. After the brakes have been released, the controller may control the wheel motors to move the enclosure 100 to the desired location, at 406.

After the enclosure 100 reaches the desired location, the controller may engage the brakes, at 408. The enclosure 100 may include sensors to detect when the brakes have been engaged. After the brakes have been engaged, the controller may control the motor of the anchoring system to drive the anchoring rod into the ground, at 410. The enclosure 100 may include sensors to detect when the anchoring rod has been driven into the ground.

In some embodiments, the enclosure 100 may include a transceiver, for example to connect to the Internet or other network. In these embodiments, the controller may obtain weather information and forecasts from the Internet, and may control the anchoring system based on this information. For example, when high winds are expected, the controller may control the anchoring system to drive the anchoring rods further into the ground.

In some embodiments, the enclosure 100 may include weather sensors. In these embodiments, the controller may control the anchoring system based on information collected by the weather sensors. For example, when the sensors detect increasing wind, the controller may control the anchoring system to drive the anchoring rods further into the ground.

Figure 5:
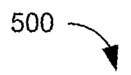
FIG. 5 is a flowchart illustrating a process for automatically controlling an anchoring system based on weather information according to some embodiments of the disclosed technologies.
Figure 5:
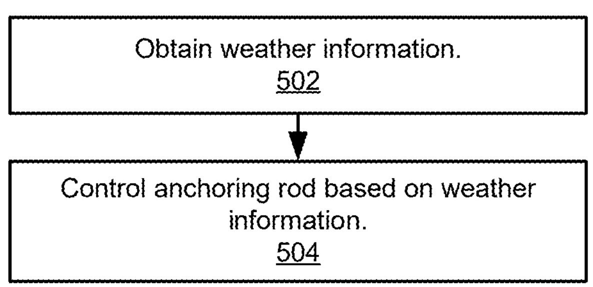

FIG. 5 is a flowchart illustrating a process 500 for controlling an anchoring system based on weather information according to some embodiments of the disclosed technologies. The elements of the process 500 are presented in one arrangement. However, it should be understood that one or more elements of the process may be performed in a different order, in parallel, omitted entirely, and the like. Furthermore, the process 500 may include other elements in addition to those presented. For example, the process 500 may include error-handling functions if exceptions occur, and the like.

Referring now to FIG. 5, the process 500 may include obtaining weather information, at 502. For example, the controller may obtain weather information locally, from a weather server, or both. Local weather information may be obtained from a local weather sensor, which may be mounted on the enclosure. The weather information may include current and/or forecast wind levels.

The process 500 may include controlling an anchoring system of the enclosure based on the obtained weather information, at 504. For example, the controller may control the anchoring system to drive the anchoring rod further into the ground when current and/or forecast wind levels exceed a predetermined threshold.

The disclosed anchoring systems provide several beneficial features. The anchoring systems quickly and automatically anchor mobile enclosures to the ground, and quickly and automatically release the mobile enclosure for repositioning. The anchoring systems may be rapidly installed on existing enclosures, and are easily automated and integrated into current mobile systems at low cost.

Figure 6:
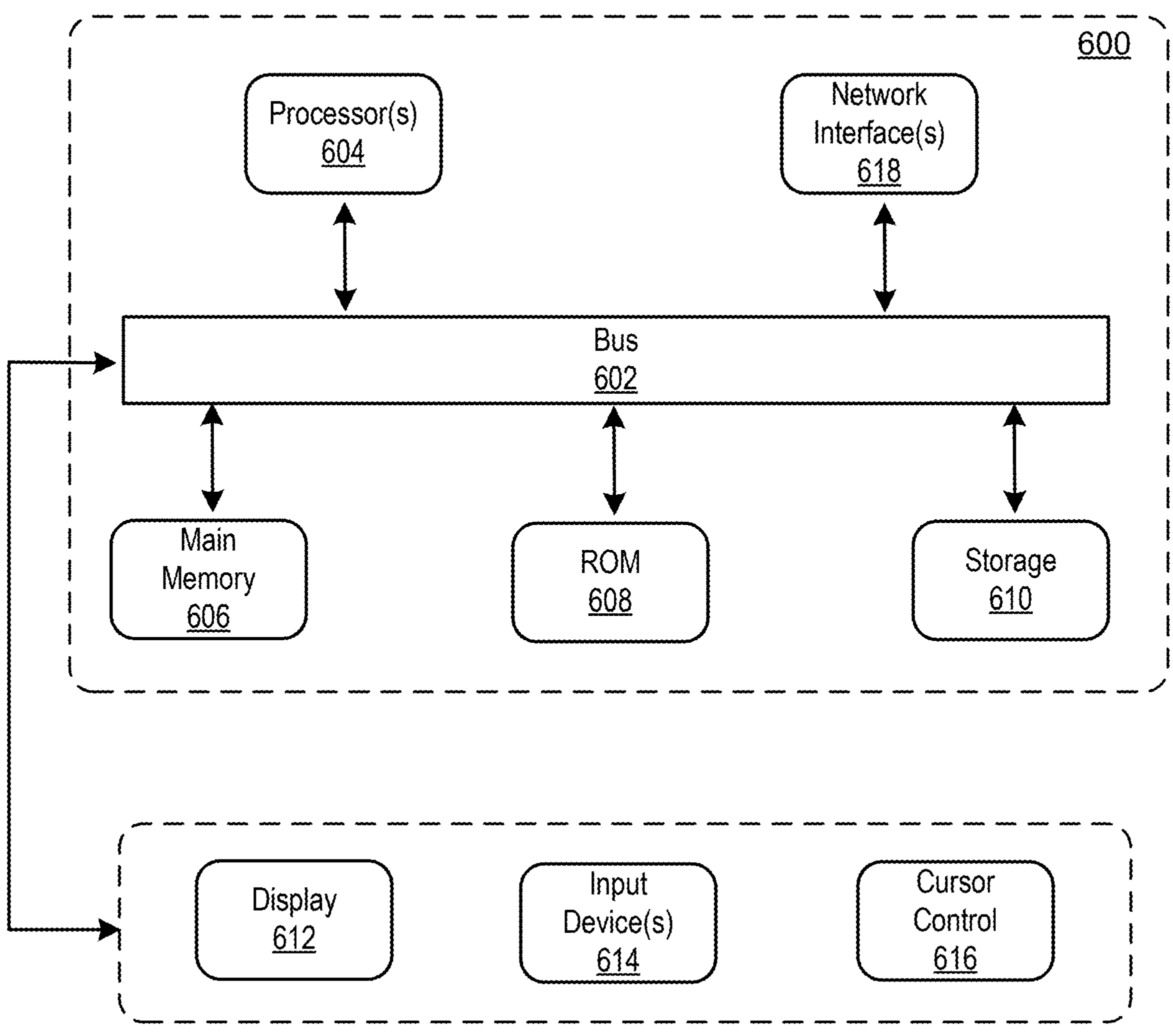
FIG. 6 depicts a block diagram of an example computer system in which embodiments described herein may be implemented.

FIG. 6 depicts a block diagram of an example computer system 600 in which embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory, (RAM) cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or a WAN component to communicate with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations.

The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An anchoring system for anchoring an at least partially floorless mobile livestock enclosure to the ground, the anchoring system comprising:

a controller;

an anchor mechanically coupled to an at least partially floorless mobile livestock enclosure; and a motor configured to place the anchor into contact with the ground, and to retract the anchor from contact with the ground;

wherein:

the enclosure comprises multiple wheels to allow the at least partially floorless mobile livestock enclosure to move across the ground, and at least one brake configured to prevent rotation of the wheels, and the controller is configured to engage the at least one brake prior to placing the anchor into contact with the ground.

2. The anchoring system of claim 1, wherein:

the anchor is a rod; and the motor is configured to place the anchor into contact with the ground by driving the rod into the ground, and to retract the anchor from contact with the ground by retracting the rod from the ground.

3. The anchoring system of claim 2, wherein:

the rod is threaded; and the motor is configured to rotate the threaded rod in a first direction to drive the threaded rod into the ground, and to rotate the threaded rod in a second direction to retract the threaded rod from the ground.

4. The anchoring system of claim 3, wherein the threaded rod comprises at least one of:

a cutting head; and an auger bit.

5. The anchoring system of claim 3, further comprising:

a securing flange configured to mechanically couple the anchoring system to the at least partially floorless mobile livestock enclosure.

6. The anchoring system of claim 5, wherein:

the threaded rod is threaded through a threaded hole in the securing flange.

7. The anchoring system of claim 3, further comprising:

a guide configured to prevent rotation of the drive as the drive rotates the threaded rod and moves up and down along the guide.

8. The anchoring system of claim 3, further comprising:

a housing configured to enclose the threaded rod, wherein the housing is further configured to prevent the threaded rod from bending.

9. The anchoring system of claim 3, wherein:

the motor is fixed with respect to the enclosure; and the threaded rod moves longitudinally with respect to the motor as the motor rotates the threaded rod.

10. The anchoring system of claim 2, wherein the anchoring system further comprises a sensor configured to sense when the motor is unable to drive the rod into the ground, or to retract the rod from the ground.

11. The anchoring system of claim 1, wherein:

the motor is a first motor;

the enclosure comprises at least one second motor configured to drive the wheels of the enclosure; and the controller is further configured to control the at least one second motor to move the enclosure to a new location, then engage the at least one brake, then control the first motor to place the anchor into contact with the ground.

12. The anchoring system of claim 1, wherein the controller is further configured to shut off the motor responsive to the sensor sensing the motor is unable to drive the rod into the ground, or to retract the rod from the ground.

13. The anchoring system of claim 1, wherein:

the enclosure comprises multiple wheels to allow the enclosure to move across the ground; and the controller is configured not to release the at least one brake responsive to the sensor sensing the motor is unable to retract the anchoring rod from the ground.

14. The anchoring system of claim 1, wherein the controller is further configured to obtain weather information, and to control the anchor based on the weather information.

15. The anchoring system of claim 1, further comprising a weather sensor configured to provide the weather information.

16. An anchoring system for anchoring an at least partially floorless mobile livestock enclosure to the ground, the anchoring system comprising:

a stake having a standing end and a free end; and a drive configured to lower the free end of the stake to the ground; and to raise the free end of the stake from the ground;

wherein motion of the enclosure in a first direction across the ground drives the free end of the stake into the ground.

17. The anchoring system of claim 16, wherein the free end is pointed.

18. The anchoring system of claim 16, wherein the drive is a motor.

19. The anchoring system of claim 18, wherein:

the enclosure comprises multiple wheels to allow the enclosure to move across the ground, and at least one second motor configured to drive the wheels; and the anchoring system further comprises a controller configured to automatically control the at least one second motor to move the enclosure in the first direction to drive the free end of the stake into the ground.

20. The anchoring system of claim 18, further comprising:

a controller;

wherein the enclosure comprises multiple wheels to allow the enclosure to move across the ground, and at least one second motor configured to drive the wheels; and wherein the controller is further configured to control the at least one second motor to move the enclosure in a second direction different from the first direction, wherein motion of the enclosure in the second direction retracts the stake from the ground.

* * * * *